Dec. 4, 1962  A. C. BROCKMAN  3,066,954
SEMI-TRAILER CONSTRUCTION AND TRACTOR AND
SEMI-TRAILER COMBINATION
Filed Aug. 21, 1957  4 Sheets-Sheet 2
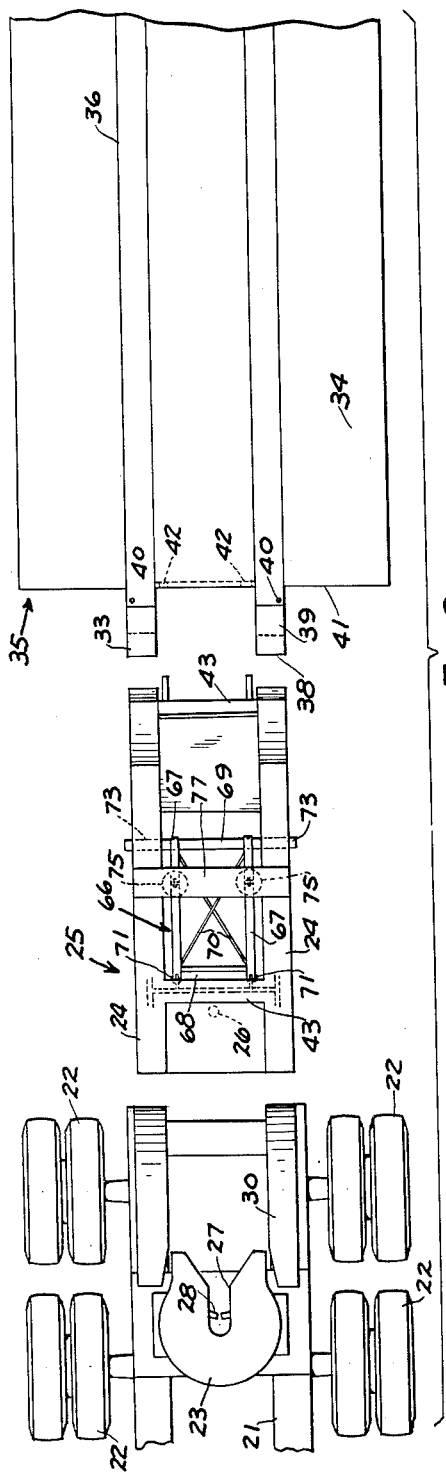
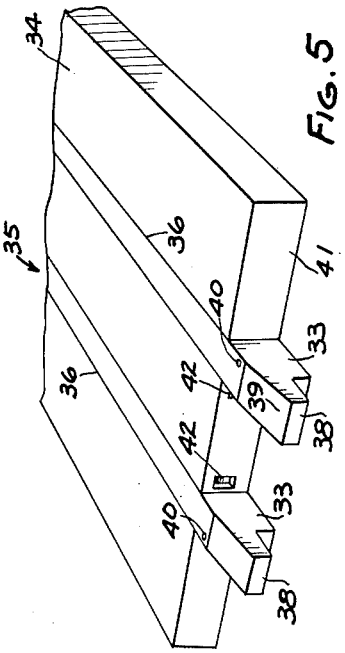
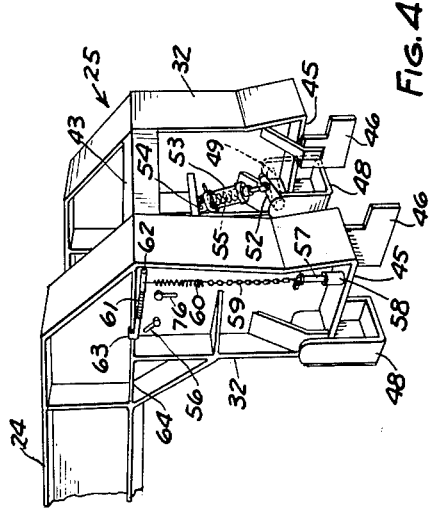
INVENTOR.
ARTHUR C. BROCKMAN
BY
Barnes, Kisselle, Raisch & Choate
ATTORNEYS

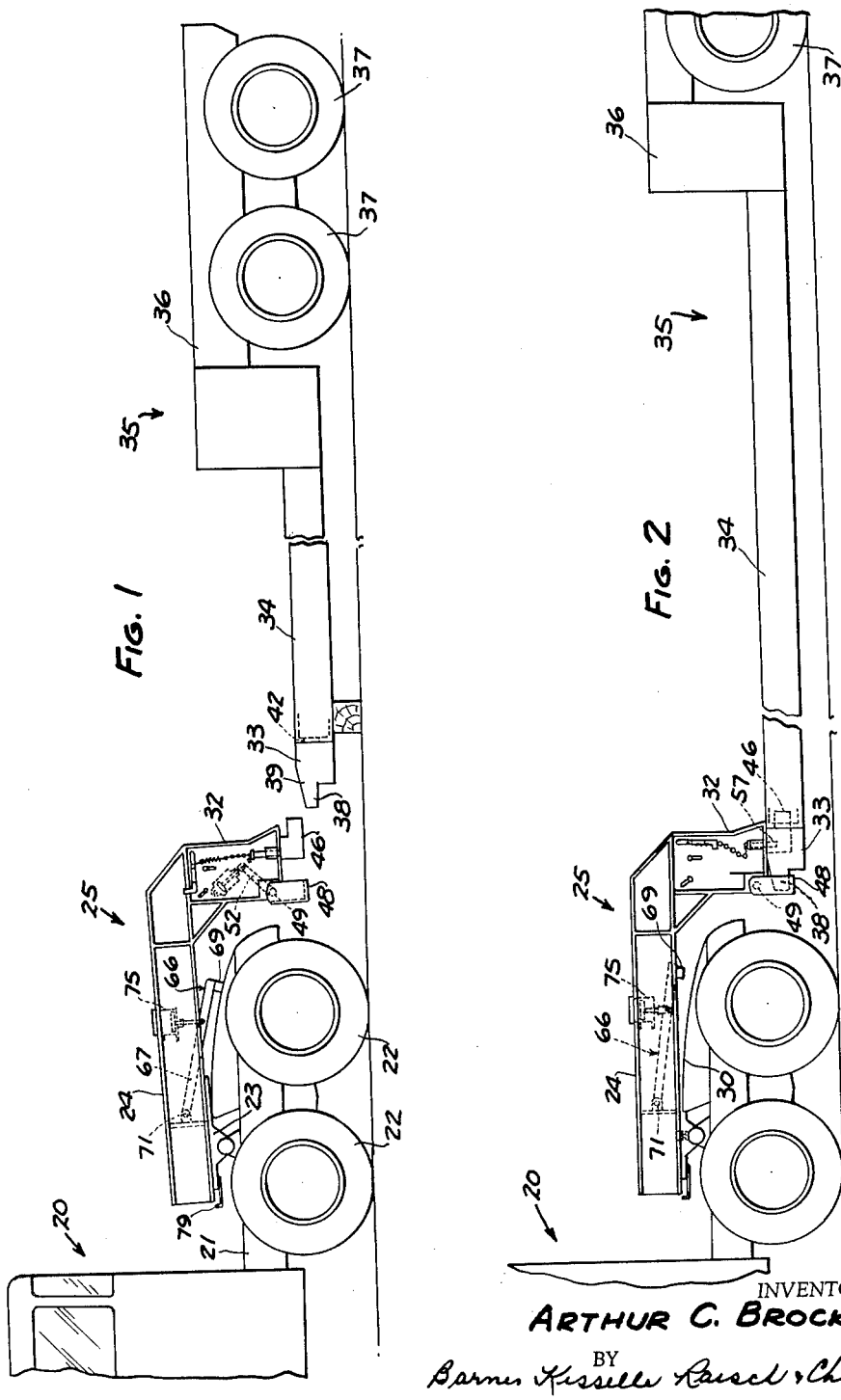

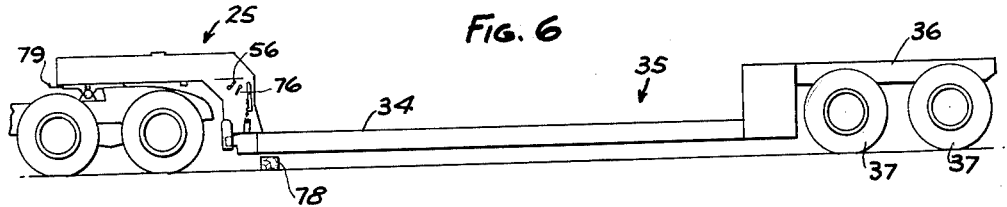
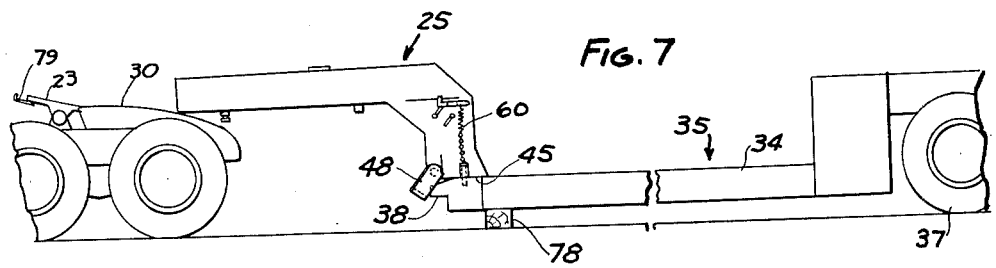
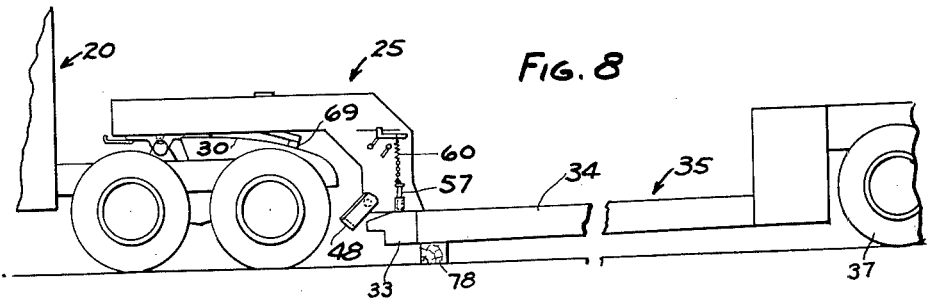
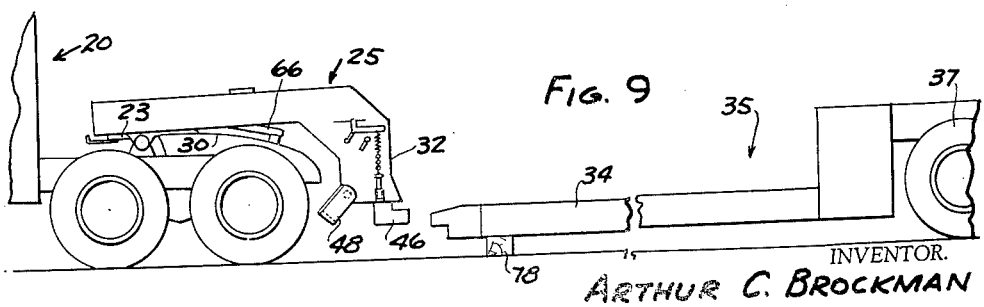

Dec. 4, 1962 A. C. BROCKMAN 3,066,954
SEMI-TRAILER CONSTRUCTION AND TRACTOR AND
SEMI-TRAILER COMBINATION
Filed Aug. 21, 1957 4 Sheets-Sheet 4

INVENTOR.
ARTHUR C. BROCKMAN
BY
Barnes Kisselle Raisch & Choate
ATTORNEYS 3,066,954
SEMI-TRAILER CONSTRUCTION AND TRACTOR
AND SEMI-TRAILER COMBINATION
Arthur C. Brockman, 25996 Balsam, Birmingham, Mich.
Filed Aug. 21, 1957, Ser. No. 709,772
5 Claims. (Cl. 280—423)

This invention relates to a tractor and semi-trailer combination and is particularly concerned with a semi-trailer of the type having a low bed and having a goose-neck type draw bar for transmitting load from the trailer bed to the fifth wheel of a tractor, the goose-neck being detachable from the trailer bed to facilitate front end loading and unloading of the trailer. Semi-trailer combinations of this type are frequently used for hauling unusually heavy loads, such as heavy industrial machinery, earth moving machinery and the like.

The goose-neck is necessarily of strong heavy construction and attaching and detaching the goose-neck from the trailer bed presents handling problems. A conventional way of meeting this problem is to mount a winch on the tractor forwardly of the fifth wheel member. The goose-neck is raised, lowered, and supported during its manipulation by means of a cable wound on the winch. Because of the relatively great weight of the goose-neck and the distance which it projects beyond the supporting part of the tractor, the winch equipment and its power take off from the tractor transmission must be relatively large, strong, and expensive. The cost of mounting a suitable winch on a tractor and adding a power take off is of the order of about $1,000.

The addition of a winch to a tractor makes it a special purpose vehicle and reduces its overall usefulness.

Another disadvantage of the winch and cable handling mechanism for a goose-neck is that the steps involved in removing the goose-neck from its trailer bed and reconnecting the goose-neck to the trailer are complex and time consuming. Moreover, if through inexperience or carelessness, the operator fails to follow the proper sequence of steps, cable breakage and damage to the winch mechanism frequently occur. Failure to follow and properly execute the sequence of steps also frequently results in dropping the goose-neck on the ground which necessarily involves a waste of time and effort in either jacking the goose-neck up or in calling in a crane of adequate capacity to lift the goose-neck for further handling.

An object of the present invention is to provide a simple, inexpensive tractor and semi-trailer structure improved to facilitate rapid, simple, relatively fool-proof manipulation of a goose-neck to and from connected relation to a low bed trailer.

The invention is carried out generally by providing the goose-neck with stirrups which receive projections on the bed. Fluid motors are provided for swinging the stirrups out of engagement with the bed projections when the goose-neck is lowered to rest the trailer bed on a support to relieve the load on the stirrups. The goose-neck is raised and lowered for this purpose by moving the tractor forward and backward relatively to the trailer with the fifth wheel elements on the goose-neck and tractor uncoupled.

The goose-neck is provided with a movable support for engaging a portion of the tractor to support the rear end of the goose-neck when it is detached from the trailer bed. This support is fluid pressure motor operated and is retractable to lower the rear end of the goose-neck to facilitate attaching it to the trailer bed.

One form of the invention is illustrated in the accompanying drawings:

FIGURE 1 is a partly diagrammatic side elevational view of a tractor and semi-trailer combination utilizing the present invention, the goose-neck being shown detached from the trailer bed.

FIGURE 2 is a view similar to FIG. 1 but shows the goose-neck attached to the trailer bed.

FIGURE 3 is a top plan view illustrating the tractor, goose-neck and trailer bed in uncoupled relation.

FIGURE 4 is a fragmentary perspective view of the goose-neck.

FIGURE 5 is a fragmentary perspective view of the forward end portion of the trailer bed.

FIGURE 6 is an elevational view illustrating the relation of the tractor goose-neck and trailer bed prior to detaching the goose-neck from the trailer bed.

FIGURES 7, 8, and 9 are views similar to FIG. 6 illustrating various steps in detaching the goose-neck from the trailer bed.

Figure 10:
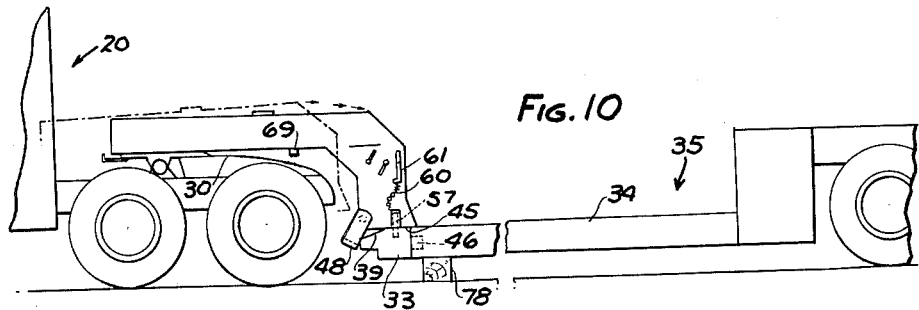
Figure 11:
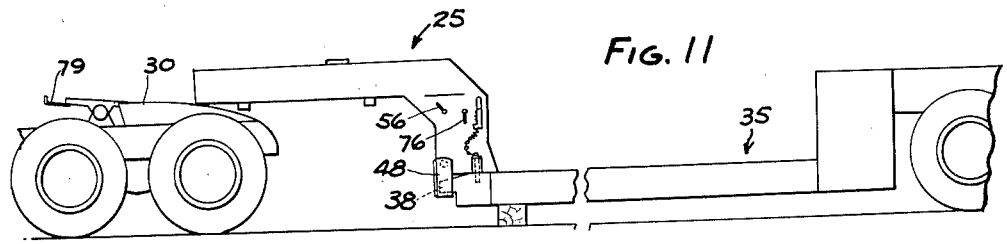
Figure 12:
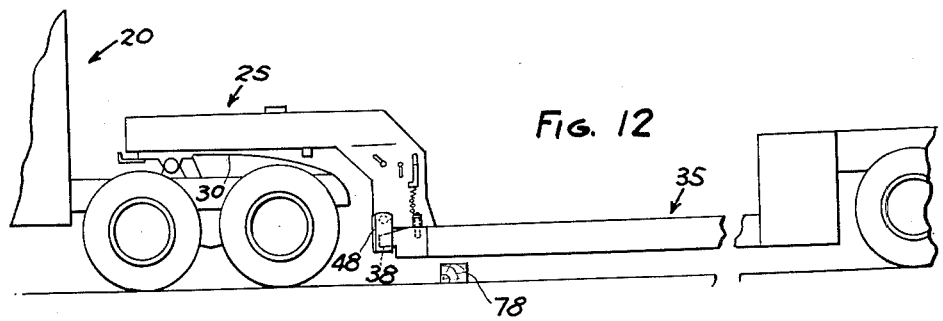

FIGURES 10, 11, and 12 are side elevational views illustrating steps taken in reconnecting the goose-neck to the trailer bed.

Shown in the drawings is a tractor 20 having a frame 21 with suspended ground engaging wheels 22. The tractor carries a fifth wheel element 23 arranged to be coupled to a complementary fifth wheel element (not shown) carried by the forward end portions of two laterally spaced generally horizontally extending members 24 of a goose-neck type draw bar 25. The goose-neck fifth wheel element has a king pin 26 arranged to enter a slot 27 on fifth wheel element 23 and to be lockingly engaged by latch members 28 (FIG. 3). Tractor 20 has ramps 30 to the rear of its fifth wheel element 23 upon which the forward ends of goose-neck members 24 ride when the tractor is moved backwardly or forwardly relatively to the goose-neck.

Goose-neck 25 has a laterally spaced pair of vertical members 32, arranged to be attached in load-bearing relation to laterally spaced forward projections 33 on the bed 34 of a low-bed type semi-trailer 35 having rearward upwardly off-set frame portions 36 with suspended ground engaging wheels 37. Projections 33 may advantageously comprise extensions of longitudinal frame members 36 of trailer bed 34. Projections 33 preferably have notched construction on their undersides to provide forwardly extending tongues 38, and upper portions of projections 33 may be sloped as at 39. Projections 33 are provided with upwardly directed openings 40, and the forward transverse member 41 of the trailer is provided with openings 42 for a purpose to be described.

Elements 24 and 32 of goose-neck 25 are secured in spaced relation by transverse members 43 and vertical elements 32 have horizontally extending base portions 45 for resting on forward portions of trailer bed 34, including portions of projections 33. Each vertical element 32 also has a depending L-shaped plate 46 with a rearwardly disposed horizontal leg arranged to enter an opening 42 in the trailer bed. A stirrup 48 is pivotally suspended as at 49 from a forward portion of each vertical goose-neck element 32. Stirrups 48 are arranged to receive tongues 38 on trailer bed extensions 33 in load-bearing relation.

Each stirrup pivot 48 is provided with a bell crank 52 which is actuated by a fluid pressure operated cylinder and piston 53, pivotally secured to the goose-neck as at 54 (FIG. 4). Cylinders 53 may advantageously be pneumatically operated; and in some instances, may be connected into the compressed air system of a vehicle equipped with air brakes. Cylinders 53 are operated by suitable valving, which may include an operating handle 56.

When air pressure is introduced into cylinders 53, they swing stirrups 48 from their downwardly depending positions (FIG. 4) to an upward position generally illustrated in FIGS. 7–10. Means are preferably provided for swinging stirrups 48 back toward vertically downward positions when pressure is relieved in cylinders 53, and this means may advantageously comprise springs 55 contained within cylinders 53 and acting between the cylinders and their respective pistons.

Each goose-neck element 32 is provided with a pin 57 vertically slideable through a guide 58 for entering and being withdrawn from holes 40 in trailer bed projections 33. A pull chain 59 is attached to each pin 57 and a spring 60 is interposed between pin 57 and a swinging arm or handle 61 pivoted on the goose-neck as at 62 for swinging from a vertical position (FIGS. 10–11) to a horizontal position shown in FIG. 4. Handle 61 has a hook portion 63 at its end for engaging a member 64 of the goose-neck.

Means are provided for supporting the rear end of the goose-neck when the goose-neck is coupled through its fifth wheel member to the tractor and the goose-neck is detached from the trailer bed. This support means comprises a frame 66 having longitudinal members 67, a forward transverse member 68, a rear transverse member 69, and diagonal members 70. The forward end portion of frame 66 is pivotally secured as at 71 to goose-neck elements 24 for swinging on a generally horizontal axis extending transversely of the goose-neck. Member 69 has laterally outwardly projecting end portions 73 positioned for engaging tractor ramps 30. Frame 66 is swung in a vertical direction for lowering and retracting member 69 by fluid pressure motors 75 supported by goose-neck elements 24 through a cross member 77.

Frame member 66 engages ramps 30 to the rear of the fifth wheel elements on the goose-neck and tractor. Motors 75 are advantageously pneumatically operated and may in some instances be connected into the air pressure system of a vehicle which is equipped with air brakes. Motors 75 are operated by suitable valving which may include an operating handle 76.

In operation, it may be assumed that initially tractor 20, goose-neck 25, and trailer 35 are in coupled relation as illustrated in FIGURE 2. King pin 26 on the goose-neck is locked to the trailer fifth wheel element 23. Support frame 66 is retracted upwardly out of engagement with ramp 30. Stirrups 48 are in their downwardly depending position, and tongues 38 of projections 33 are engaged within the stirrups. The load of trailer bed 34 is transmitted through tongues 38 to stirrups 48 in a load-bearing connection, and the load is transmitted to the tractor through the goose-neck.

When the load of tongues 38 is bearing on the bottoms of stirrups 48, there is sufficient friction between them to restrain any forward movement of the goose-neck relatively to the trailer under many situations. However, a positive draft coupling between the goose-neck and trailer is provided by pins 57 which project into openings 40 in bed projections 33.

When it is desired to detach goose-neck 25 from semi-trailer 35, the operator dismounts from the cab of tractor 20 and disconnects the air lines and electrical cords between the tractor and semi-trailer. At the same time, he manipulates valve handle 56 to introduce air under pressure into cylinders 53 and manipulates valve handle 76 to prepare a pneumatic circuit for operation of fluid motors 75. At this time, the operator places a support 78 under the forward end of trailer bed 34, unlocks the fifth wheel coupling as by manipulating lever 79 (FIG. 6), and raises arm 61 and secures it in horizontal position by engaging hook 63 on goose-neck element 64.

The force exerted by cylinders 53 on stirrups 48 is insufficient to overcome the frictional connection between the stirrups and tongues 38. Elevating arm 61 tensions spring 60 and the spring tension may or may not withdraw pins 57 from openings 40 at this time, depending on whether the pins are frictionally clamped between contiguous portions of guide 58 and projections 33.

The operator now returns to his cab and drives tractor 20 forward. The brakes on trailer wheels 37 have become set when the airlines were disconnected so that semi-trailer 35 and goose-neck 25 do not advance with the tractor. The forward end portions of the goose-neck ride down ramps 30 on the tractor so that the forward end portion of the trailer bed is lowered to rest on support 78. This relieves the load of tongues 38 on stirrups 48 so that the frictional connection therebetween is reduced and cylinders 53 now operate through crank arms 52 to swing the stirrups forwardly and somewhat upwardly out of engagement with tongues 38. This position of the parts is generally illustrated in FIGURE 7. Horizontal base portions 45 of goose-neck members 32 are supported by forward portions of the trailer bed as shown. In most instances, the slight relative movement of the goose-neck and semi-trailer during this step will have relieved any frictional grip on pins 57 so that they will be withdrawn from holes 40 by springs 60.

The operator now backs the tractor so that the forward end of the goose-neck rides up ramp 30, and the fifth wheel elements on this goose-neck and tractor recouple. If spring 60 has not previously withdrawn pins 57 from trailer bed openings 40, they do so at this time in the large majority of cases.

The operator now manipulates suitable valving contained within the tractor cab to introduce air under pressure into motors 75 which swing support frame 66 downwardly so that frame element 69 engages ramps 30 to the rear of the fifth wheel for supporting the rearward portions of the goose-neck independently of trailer bed 34 and its projections 33. The relative position of the parts is shown in FIGURE 8.

The operator may now drive the tractor forwardly to completely remove the goose-neck from the semi-trailer, leaving the forward end of the semi-trailer unobstructed to facilitate front end loading and unloading of the trailer bed. When the operator drives the tractor forward, hook elements 46, depending from the base portions 45 of goose-neck members 32, disengage from forwardly disposed holes 42 at the front end of the trailer bed. The relative positions of the parts is illustrated in FIG. 9.

It is to be noted that in detaching goose-neck 25 from trailer bed 34, the operator needs to dismount from the cab of his tractor only once and requires no outside help. Even though the operator may drive his tractor completely out from under the goose-neck in the FIGURE 7 step, the hook shaped plates 46 will remain engaged in openings 42 so that when the front end of the goose-neck lowers upon the removal of the tractor support, the goose-neck will merely rock downwardly until the ends of the plates 46 engage upwardly against the tops of openings 42. Hooks 46 and openings 42 are arranged so that in this event the forward end of the goose-neck will remain sufficiently elevated to engage ramp 30 when the tractor is again backed under the goose-neck. There is no danger of dropping the goose-neck to the ground.

The same is true when it is desired to uncouple the tractor from the semi-trailer, leaving the goose-neck attached to the trailer bed. In this event, the operator dismounts from the tractor, and disconnects the air lines and electrical cords, unlocks the fifth wheel connection, and drives the tractor out from under the goose-neck. Hooks 46 support the goose-neck in the manner described.

To reconnect the goose-neck to the trailer bed, the operator lowers arm 61 to its vertical position, thus relieving the tension in spring 60 and permitting pins 57 to drop into a downwardly projecting position relatively to bases 45 of the vertical goose-neck members. The operator then backs tractor 20 toward the trailer bed with goose-neck 25 supported at its rear end by support frame 66 until the ends of plates 46 strike the forward end member 41 of the trailer bed. The operator then, by suitable valving in his cab, operates motors 75 to retract support frame 66 slightly to lower the rear end of the goose-neck until plates 46 are positioned for entering trailer bed openings 42. The operator then backs the trailer to insert plates 46 into openings 42. During backing movements of the trailer, pins 57 ride up the inclined upper surfaces 39 of trailer projections 33 and drop into openings 40. Base portions 45 are now supported by forward portions of trailer bed 34, and the operator now retracts support frame 66 so that its member 69 disengages ramp 30. At this time, the parts are in the position illustrated in FIGURE 10.

The driver now dismounts from the cab, unlocks the fifth wheel connection by operating lever 79; and if he has not already done so, shifts handle 56 to relieve the air pressure in cylinders 53. He may at this time also shift handle 76 to disconnect the pneumatic circuit from support frame operating motors 75. The tractor is now driven forwardly, but the goose-neck is restrained from forward movement by pins 57 so that the forward end of the goose neck rides down ramp 30. When the forward end of the goose-neck has been lowered sufficiently, stirrups 48 swing under tongues 38 under the action of springs 55 (FIG. 11).

Should the operator drive the tractor completely out from under the goose-neck in this step, the goose-neck will remain supported on the trailer bed by the action of plates 46 as described. The operator now backs his tractor so that the forward end of the goose-neck rides up ramps 30 until the fifth wheel elements on the goose-neck and tractor are coupled. This elevates the goose-neck so that the load-bearing connection between stirrups 48 and tongues 38 is re-established (FIG. 12). Block 78 may now be removed from beneath the trailer bed, the air lines and the electrical cords to the semi-trailer reconnected, and the vehicle is ready for operation.

The initial reconnecting steps described above may be followed by a person having little skill and little or no experience. However, it will be appreciated that an experienced operator is able to back the tractor with the goose-neck thereon and simultaneously lower the goose-neck by retracting its supporting frame 66 so that plates 46 will enter openings 42 in the initial backing movement. The path followed by the rearward portions of the goose-neck are illustrated generally by the dotted lines and arrows in FIGURE 10.

It is to be noted that in reconnecting the goose-neck to the trailer bed, the operator is required to dismount from his tractor only once and requires no outside help.

The present invention enables a conventional goose-neck to be converted for the simple rapid manipulation described by the addition of about $100 worth of pneumatic and mechanical equipment. As noted above, the conventional winch equipment, and power take-off cost about $1,000.00 to install on a tractor.

I claim:

1. In a tractor and semi-trailer combination wherein the semi-trailer has a bed member and a detachable goose-neck member which transmits vertical load from the bed member to the tractor, the goose-neck member and tractor having detachably coupled complementary fifth wheel elements, the improvement which comprises, projecting means on one of said members and stirrup means on the other member supporting said projecting means to form a load-bearing connection transmitting vertical load from said bed member to said goose-neck member, said load-bearing connection providing a frictional coupling adequate to restrain forward movement of said goose-neck member relative to said bed member when said tractor is moved forwardly with said fifth wheel elements uncoupled, said stirrup means being disengageable from said projecting means when bed-member load thereon is relieved, means on said goose-neck member and tractor cooperable upon forward movement of said tractor relative to said goose-neck member when said fifth wheel elements are uncoupled to lower said goose-neck member so that said bed member can be rested upon a support to relieve the load of said projecting means on said stirrup means, actuating means including a fluid pressure motor operable while said stirrup means supports said projecting means to bias said stirrup means toward disconnected relation to said projecting means with inadequate force to overcome said frictional coupling, said actuating means being operable responsively to relief of vertical load on said goose-neck member to disconnect said load-bearing connection, said goose-neck member and bed member including means cooperable to restrain rearward movement of said goose-neck member relative to said bed member when said stirrup means and projecting means are disengaged, said means on said goose-neck member and tractor being cooperable upon backing movement of said tractor relative to said goose-neck member to elevate said goose-neck member for coupling said fifth wheel elements, said actuating means being manipulable to inactive condition, said stirrup means being manipulable for re-engagement with said projecting means when said actuating means is in said inactive condition.

2. In a tractor and semi-trailer combination wherein the semi-trailer has a bed member and a detachable goose-neck member which transmits vertical load from the bed member to the tractor, the goose-neck member and tractor having detachably coupled complementary fifth wheel elements, goose-neck structure comprising, a generally vertical portion and a generally horizontal forwardly extending portion, said vertical portion having a base portion adapted to rest on a forward portion of the bed member, said horizontal portion having a fifth wheel element thereon adapted to engage a complementary fifth wheel element on the tractor, said vertical portion also having depending stirrup means pivotally mounted thereon, said stirrup means being adapted to engage and support projecting means on the trailer bed in load-bearing relation, fluid pressure motor means selectively operable to bias said stirrup means out of engagement with the projecting means on the bed member, but with inadequate force to overcome the frictional coupling between the stirrup means and projecting means incident to bed-member load on said stirrup means, said goose-neck member carrying movable support means adapted to supportingly engage a portion of a tractor to which the goose-neck member is adapted to be coupled at a location rearwardly of the coupled fifth wheel elements to support the rearward portion of said goose-neck when said goose-neck is detached from the bed member, said support means being retractable to facilitate lowering said goose-neck so that said base portion can be rested on a forward portion of the bed member as described.

3. The combination defined in claim 2 wherein said movable support means is moved in a generally vertical direction by fluid pressure motor means for engaging and retracting from the tractor.

4. In a tractor and semi-trailer combination wherein the semi-trailer has a bed member and a detachable goose-neck member which transmits vertical load from the bed member to the tractor, the goose-neck member and tractor having detachably coupled complementary fifth wheel elements, the improvement which comprises, means forming a load-bearing connection transmitting vertical load from said bed member to said goose-neck member, said load-bearing connection providing a frictional coupling adequate to restrain forward movement of said goose-neck member relative to said bed member when said tractor is moved forwardly with said fifth wheel elements uncoupled, said load-bearing connection being disconnectable when bed-member load thereon is relieved, means on said goose-neck member and tractor cooperable upon forward movement of said tractor relative to said goose-neck member when said fifth wheel elements are uncoupled to lower said goose-neck member so that said bed member can be rested upon a support to relieve bed-member load on said goose-neck member, actuating means operable upon relief of vertical bed-member load on said goose-neck member to disconnect said load-bearing connection, said goose-neck member and said bed member including means cooperable to restrain rearward movement of said goose-neck member relative to said beed member when said load-bearing connection is disconnected, said means on said goose-neck member and tractor being cooperable upon backing movement of said tractor relative to said goose-neck member to elevate said goose-neck member for coupling said fifth wheel elements, and a draft coupling between said goose-neck member and bed member including aligned apertured means on said members and pin means in said apertured means extractable to release said draft coupling.

5. In a tractor and semi-trailer combination wherein the semi-trailer has a bed member and a detachable goose-neck member which transmits vertical load from the bed member to the tractor, the goose-neck member and tractor having detachably coupled complementary fifth wheel elements, the improvement which comprises, means forming a load-bearing connection transmitting vertical load from said bed member to said goose-neck member, said load-bearing connection providing a frictional coupling adequate to restrain forward movement of said goose-neck member relative to said bed member when said tractor is moved forwardly with said fifth wheel elements uncoupled, said load-bearing connection being disconnectable when bed-member load thereon is relieved, means on said goose-neck member and tractor cooperable upon forward movement of said tractor relative to said goose-neck member when said fifth wheel elements are uncoupled to lower said goose-neck member so that said bed member can be rested upon a support to relieve bed-member load on said goose-neck member, actuating means operable upon relief of vertical bed member load on said goose-neck member to disconnect said load-bearing connection, said goose-neck member and said bed member including means cooperable to restrain rearward movement of said goose-neck member relative to said bed member when said load-bearing connection is disconnected, said means on said goose-neck member and tractor being cooperable upon backing movement of said tractor relative to said goose-neck member to elevate said goose-neck member for coupling said fifth wheel elements, and a draft coupling between said goose-neck member and bed member including aligned apertured means on said members and pin means in said apertured means extractable to release said draft coupling, and resilient means selectively operable to extract said pin means from said apertured means upon relief of draft load on said pin means.

References Cited in the file of this patent
UNITED STATES PATENTS

| | | |
|---|---|---|
| 2,545,584 | Meadows | Mar. 20, 1951 |
| 2,663,574 | Martin | Dec. 22, 1953 |
| 2,667,363 | Talbert | Jan. 26, 1954 |
| 2,676,783 | Rogers | Apr. 27, 1954 |
| 2,822,945 | Duffy | Feb. 11, 1958 |